United States Patent
Mehta et al.

(10) Patent No.: US 8,065,438 B2
(45) Date of Patent: Nov. 22, 2011

(54) MODIFICATION TO AS_PATH ELEMENTS

(75) Inventors: Pranav Mehta, San Jose, CA (US);
Pradosh Mohapatra, Fremont, CA (US); Robert Rszuk, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 548 days.

(21) Appl. No.: 11/559,581

(22) Filed: Nov. 14, 2006

(65) Prior Publication Data

US 2008/0112418 A1 May 15, 2008

(51) Int. Cl.
*G06H 15/16* (2006.01)
*H04L 12/28* (2006.01)

(52) U.S. Cl. .............. 709/249; 370/395.31; 370/395.3

(58) Field of Classification Search ............. 370/395.31, 370/395.3; 709/249
See application file for complete search history.

(56) References Cited

U.S. PATENT DOCUMENTS

| | | | |
|---|---|---|---|
| 6,463,061 B1 * | 10/2002 | Rekhter et al. | 370/392 |
| 6,526,056 B1 * | 2/2003 | Rekhter et al. | 370/392 |
| 6,765,921 B1 * | 7/2004 | Stacey et al. | 370/401 |
| 2002/0061011 A1 * | 5/2002 | Wan | 370/352 |

FOREIGN PATENT DOCUMENTS

JP 11111851 A * 4/1999

OTHER PUBLICATIONS

Rosen et al., RFC 4364: BGP/MPLS IP VPNs, Mar. 1999.*
Rosen et al., RFC 4364: BGP/MPLS IP Virtual Private Networks (VPNs), Feb. 2006.*
Rekhter et al., RFC 4271 A Border Gateway Protocol 4 (BGP-4), Jan. 2006.*
Freesoft.org, "BGP-4 Protocol Overview," www(dot)freesoft(dot)org/CIE/Topics/88.html, Dec. 7, 2002 as retrieved by the Internet Archive (www(dot)archive(dot)org.*
Lougheed et al.., RFC 1105—Border Gateway Protocol (BGP), faqs.org/rfcs/rfc1105.html, Jun. 1989.*
Hengartner et al., "Detection and Analysis of Routing Loops in Packet Traces," Proc. ACM SIGCOMM Internet Measurement Wksp., Marseille, France, Nov. 2002.*
Introduction to BGP. Cisco Systems, Inc. 2003. http://map.twnic.net.tw/ip93/doc/k/bgp.pdf. Last accessed Jan. 16, 2007. pp. 1-107.
Introduction to BGP. Cisco Systems, Inc. 2003. http://map.twnic.net.tw/ip93/doc/k/bgp.pdf. Last accessed Jan. 16, 2007. pp. 108-225.
Introduction to BGP. Cisco Systems, Inc. 2003. http://map.twnic.net.tw/ip93/doc/k/bgp.pdf. Last accessed Jan. 16, 2007. pp. 226-339.
Introduction to BGP. Cisco Systems, Inc. 2003. http://map.twnic.net.tw/ip93/doc/k/bgp.pdf. Last accessed Jan. 16, 2007. pp. 340-445.
Tejas Suthar. IPv6-A Service Provider View in Advancing MPLS Networks. The Internet Protocol Journal—vol. 8, No. 2. Jun. 2005. http://www.cisco.com/web/about/ac123/ac147/archived_issues/ipj_8-2/ipj_8-2.pdf. Last accessed Jan. 16, 2007.

* cited by examiner

Primary Examiner — Ashok Patel
Assistant Examiner — Evans Desrosiers
(74) Attorney, Agent, or Firm — Schwegman, Lundberg & Woessner, P.A.

(57) ABSTRACT

In one or more embodiments, an architecture is provided that may intercept a route update message and compare AS numbers of an AS path with a list of AS numbers known or inferred to be problematic. In one or more embodiments, the problematic AS numbers can be substituted with a local AS number such that loop detection checks enforced automatically on many networks do not discard the message and/or prevent connectivity between two disparate networks.

18 Claims, 12 Drawing Sheets

MODIFICATION TO AS_PATH ELEMENTS

TECHNICAL FIELD

The subject disclosure relates generally to establishing interconnectivity between disparate networks such as Virtual Private Networks (VPNs) that employ Border Gateway Protocol (BGP) for distributing routes over a backbone.

BACKGROUND

Many businesses (e.g., customers) often employ a single service provider to handle Internet Protocol (IP) services for all of the customer networks. For example, a customer can organize and maintain multiple Virtual Private Networks (VPNs) at disparate locations around the globe with a single service provider managing services such as Internet connectivity (e.g. by way of the service provider's backbone) for all of the individual VPNs. In some cases, there will exist varying levels of security between these VPNs. Thus, all traffic between VPNs must first traverse a firewall or De-Militarization Zone (DMZ). In other cases, public access (e.g., non-secure access) can also require a firewall or DMZ before entering any of the disparate VPNs. Some customers, especially large businesses maintain a central DMZ through which all traffic must traverse before reaching any of the VPNs.

Conventionally, establishing connectivity between VPNs has been difficult, if not impossible due to loop detection checks necessarily enforced by standard Border Gateway Protocol. Thus, in some cases, BGP standards have been relaxed by various functions to mitigate this difficulty. As one example, the AS-override function can be employed, however, this function can only be employed between neighboring autonomous systems (peers). Another example is the allowAS-in function, but this function is not implemented by many service providers. In other cases, BGP can be redistributed to Interior Gateway Protocol (IGP), but this scheme is very labor intensive and inefficient.

DESCRIPTION

Overview

Figure 1:
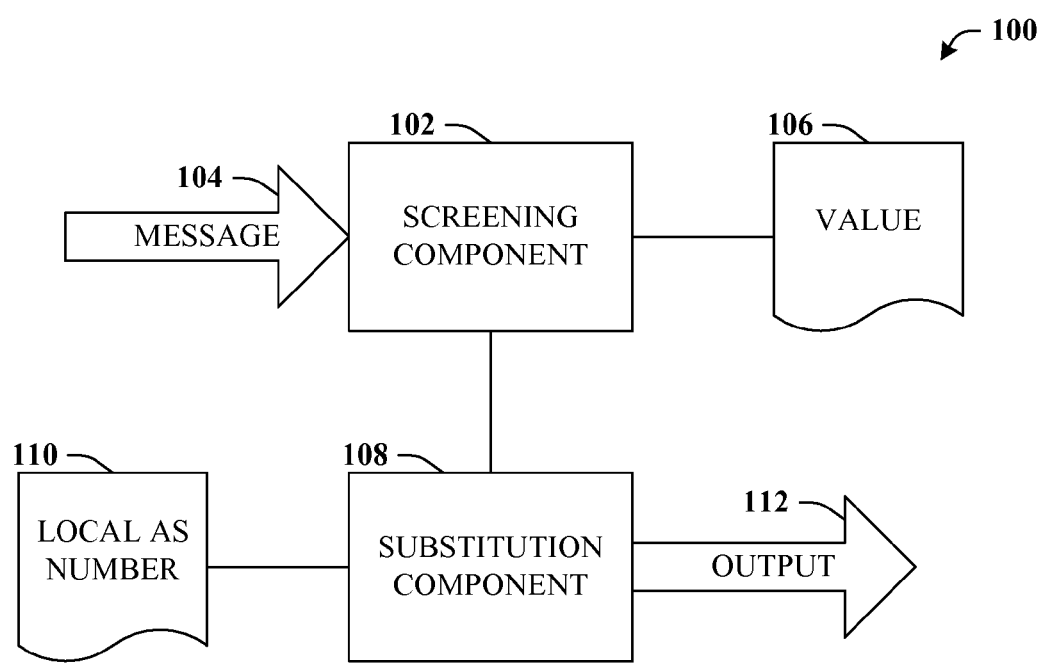
FIG. 1 illustrates a block diagram of an example system that may mitigate loop detection failure by selective modification to Autonomous System (AS) elements/attributes.

The following presents a simplified overview of the claimed subject matter in order to provide a basic understanding of some embodiments described herein. This is not an extensive overview of the claimed subject matter. It is intended to neither identify key or critical elements of the claimed subject matter nor to delineate the scope of that subject matter. Its sole purpose is to present some concepts of the claimed subject matter in a simplified form as a prelude to the more detailed description of example embodiments that is presented later.

The claimed subject matter relates to identifying whether an autonomous system (AS) number included in an AS path of a message matches a set of AS numbers that may be problematic. The identified AS number can be substituted with a local AS number.

The following description and the annexed drawings set forth in detail certain illustrative embodiments of the claimed subject matter. These embodiments may be indicative, however, of but a few of the various ways in which the principles of the claimed subject matter may be employed and the claimed subject matter is intended to include many and/or all such embodiments and their equivalents. Other advantages and novel features of the claimed subject matter will become apparent from the following description of example embodiments when considered in conjunction with the drawings.

Description of Example Embodiments

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As utilized herein, the terms "component," "system," "interface," "message," "protocol," "communications," and the like can refer to a computer-related entity, either hardware, software (e.g. in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g. compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Now turning to the figures, FIG. 1 illustrates a system 100 that may mitigate loop detection failure by selective modification to Autonomous System (AS) elements/attributes. Generally, the system 100 may include a screening component 102 that may be configured to receive a message 104. The message 104 may comprise an AS path (not shown), which typically includes one or more AS number(s) (not shown), both described in more detail infra with reference to FIG. 2. The screening component 102 may be configured to identify a particular AS number included in the message 104. For example, the screening component 102 may compare the one or more AS number(s) to a value 106. If a particular AS number of the message 104 matches the value 106, then the particular AS number may be selected and/or flagged. It is to be understood that the value 106 can be a single AS number or a plurality of AS numbers. As such, in the case of a plurality of AS numbers, the screening component 102 may select or flag more than one AS number in the AS path of the message 104.

The system 100 may also include a substitution component 108 operatively coupled to the screening component 102. The substitution component 108 may be configured with a local AS number 110 (described more fully in FIG. 3). The substitution component 108 may replace the flagged/selected AS numbers (e.g., those AS numbers that match value 106) with the local AS number 110. Thus, output 112 can be substantially identical to message 104 such as when message 104 does not contain an AS number equivalent to value 106. However, in other situations, such as when the value 106 does match an AS number included in message 104, then output 112 can include the local AS number 110 rather than the AS number equal to the value 106.

Figure 2:
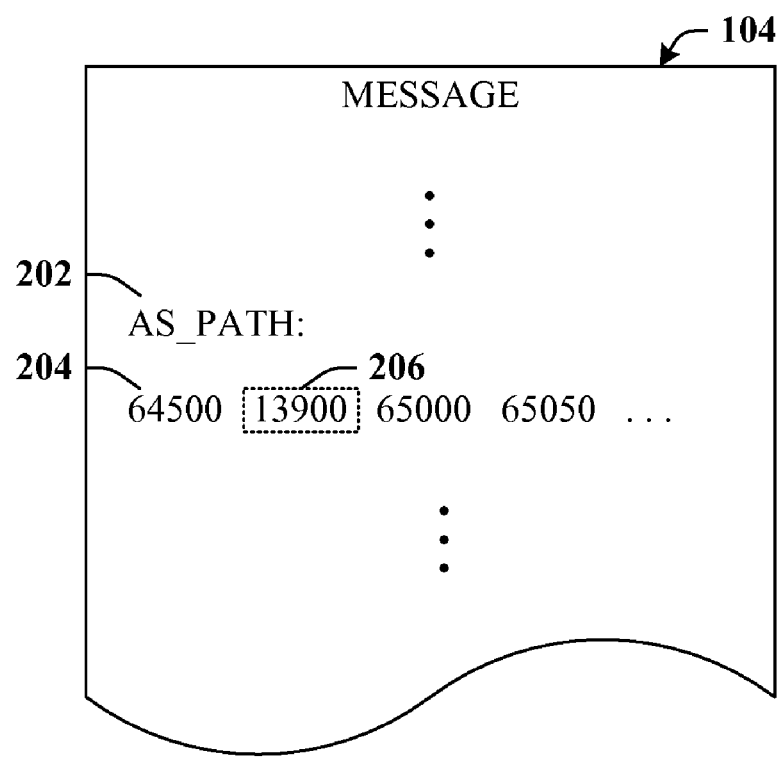
FIG. 2 illustrates an example embodiment of a message and/or routing advertisement.

With brief reference to FIG. 2, an example embodiment of message 104 is depicted. In general, the message 104 may be an open route message, an update route message, or virtually most any routing advertisement intended to establish, renew, or modify the route and/or routing tables. In accordance with one embodiment, the message 104 can include an AS path 202. The AS path 202 can include one or more AS numbers 204, that can represent an ordered listing of the autonomous systems traversed by the message 104. As indicated, the most recent autonomous system through which the message 104 propagated was 64500. Further, the AS path 202 (e.g., route) from the origin to its current location traversed autonomous system 65050, 65000, 13900, then 64500, in that order.

As described supra in connection with FIG. 1, the one or more AS numbers 204 can include a flagged or matching AS number 206 (e.g., the AS number 206 matches value 106). It is to be appreciated that although only one matching AS number 206 is depicted, more than one matching AS number 206 might exist. It is also to be appreciated and understood that message 104 need not include a matching AS number 206 at all such as when none of the one or more AS numbers 204 of the AS path 202 correspond to any one of the value(s) 106. Moreover, the message 104 can further include various other data such as header information, version number, local/origin attributes, or the like.

Figure 3:
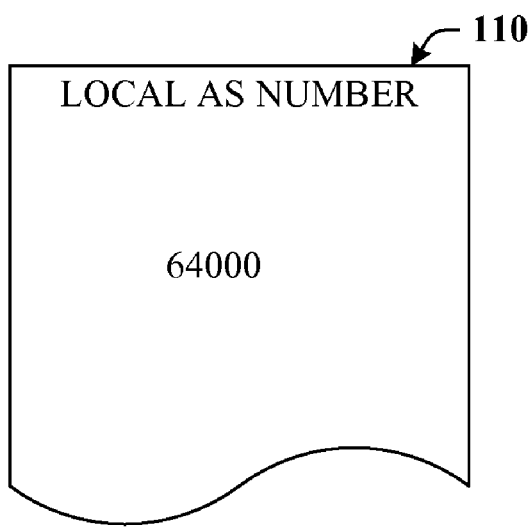
FIG. 3 illustrates an example embodiment of the local AS number that corresponds to an autonomous system.

Referring briefly to FIG. 3, an example embodiment of the local AS number 110 is illustrated. Here, the local AS number 110 is 64000, however, it is to be appreciated that 64000 is merely an example and the local AS number 110 (as well as the one or more AS numbers 204 in FIG. 2) could be other values as well. Generally, an autonomous system is a collection of Internet Protocol (IP) networks and routers under the control of a single entity or collection of entities that presents a common routing policy to the Internet, each of which can be assigned a unique AS number (e.g., local AS number 110, AS numbers 204). Typically, all AS numbers are assigned by the Internet Assigned Numbers Authority (IANA), which is operated by ICANN (Internet Corporation for Assigned Numbers and Names).

Border Gateway Protocol (BGP) allows autonomous systems (to which an AS number can be registered/assigned) to be public or private. For example, an organization can have one or several private autonomous systems such as Virtual Private Networks (VPNs) with private AS numbers. However, a service provider that, e.g. provides an IP backbone for connectivity to the Internet for its customers' networks generally must have a public AS number. For further information, RFC 1930 provides definitions and guidelines for an autonomous system and RFC 4271 codifies a version of BGP.

In accordance with the foregoing, the local AS number 110 need not be an arbitrary value, or even one that is configurable or intended to change. Rather, the local AS number 110 may instead be a persistent number registered with the IANA, which designates a particular autonomous system with a certified and valid AS number such as local AS number 110.

Figure 4:
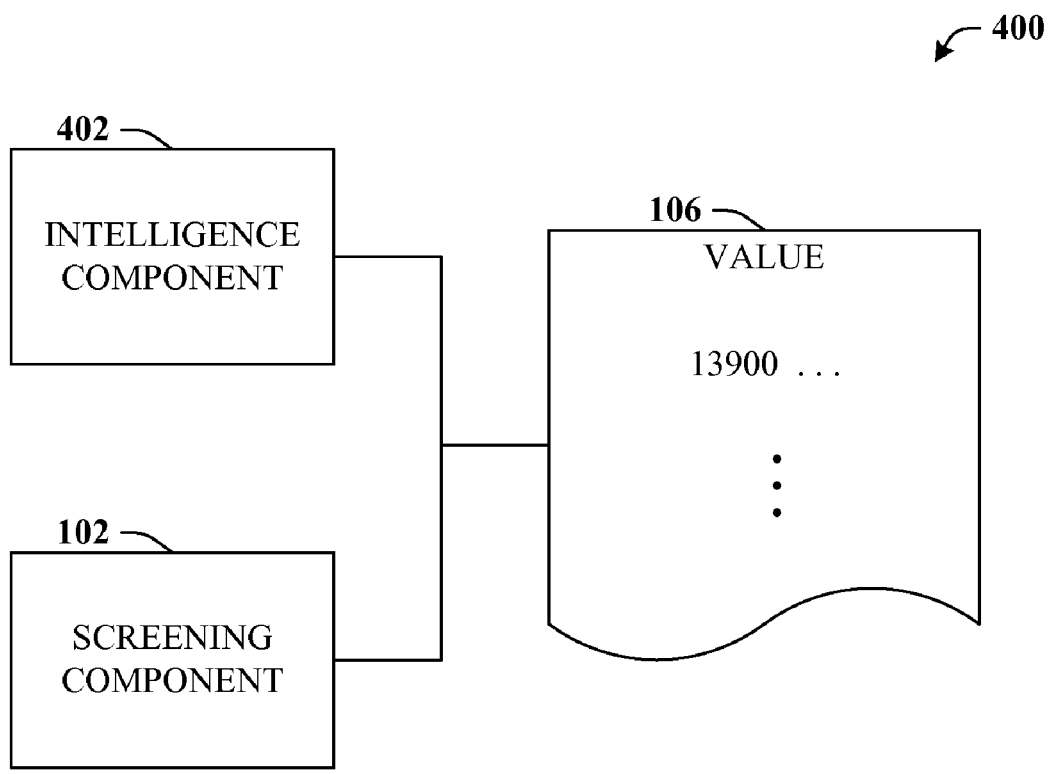
FIG. 4 illustrates a block diagram of an example system that can configure a set of value(s) to match known or inferred problematic AS numbers.

Turning now to FIG. 4, a system 400 that can configure a set of value(s) 106 is illustrated. Unlike, the local AS number 110, which is typically not modifiable, the value 106 is easily configurable. The value (or values) 106 can, e.g. be configured to correspond to particular AS numbers (e.g., the AS number 206 from FIG. 2) such as AS numbers that might fail a loop detection check. Loop detection checks are often enforced automatically in the case of BGP (e.g., to ensure a route from A to B is the shortest path) and will be detailed more fully with reference to FIG. 6 described below.

The screening component 102, which can employ the value 106 in order to detect matching AS numbers can also be employed to configure the value 106. It is to be appreciated that another component (not shown) might be employed to configure the value 106 as well. In addition, the system 400 can also include an intelligence component 402 that can directly modify and/or configure the value(s) 106 or provide supplemental aid to the screening component 102 for that task. For example, when an organization constructs distributed networks, certain AS numbers that may present reachability or connectivity issues might be known in advance. If so, screening 102 can populate value 106 with a set of numbers corresponding to the troublesome AS numbers.

However, in other cases, AS numbers that may present connectivity issues may not, for whatever reason, be known. Accordingly, these AS numbers can be configured at a later time, or additionally/alternatively the intelligence component 402 can determine these and update the value(s) 106. For example, the intelligence component 402 can be supplied with or have access to a data store with AS numbers associated with, e.g. service provider networks, and then infer those service provider AS numbers that should be present in value 106. In accordance with one embodiment, the intelligence component 402 (or screening component 102) can remove numbers from value 106. For instance, intelligence component 402 might infer that potential connectivity issues associated with an AS number has been mitigated in another way such as by employing allowAS-in or AS-override functions, or in the case of redistributing from BGP to Interior Gateway Protocol (IGP) in order to delete particular AS numbers. While none of these supplemental mechanisms are useful in every case for which there are connectivity issues with certain AS numbers, the intelligence component 402 can detect their use and, if desired, remove that particular AS number from the value 106.

In accordance with one embodiment, the intelligence component 402 can examine the entirety or a subset of the data available (e.g. organization networksNVPNs, service provider networks, associated AS numbers, peer/neighbor information . . . ) and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
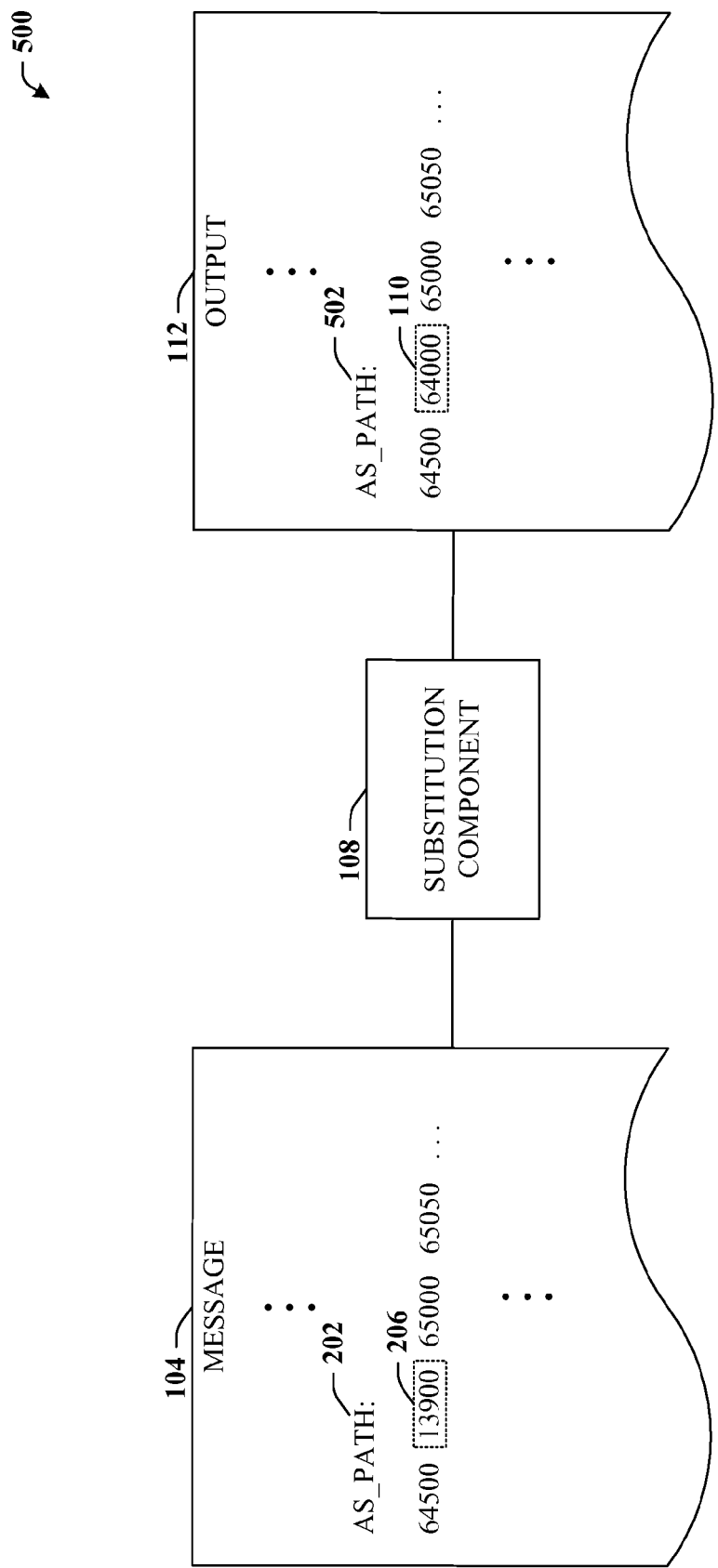
FIG. 5 illustrates a block diagram of an example system that can selectively replace attributes/elements of an AS path.

FIG. 5 illustrates a system 500 that can selectively replace elements of an AS path. The system 500 can include the substitution component 108 that can receive (e.g., by way of screening component 102 from FIG. 1) message 104. Message 104 can include the AS path 202 with the AS number 206 that can facilitate connectivity issues. In one or more embodiments, the substitution component 108 can mitigate such connectivity issues by overwriting the AS number 206 with the local AS number 110. As depicted, the output 112 includes AS path 502 which includes the local AS number 110 (e.g. 64000) rather than the original AS path 202 of message 104, which included the AS number 206 (e.g., 13900).

It is to be understood that in accordance with one embodiment, the replacement of an element (e.g, AS number 206) of the AS path 202 can be controlled and/or occur with built-in safety measures. That is, rather than simply swapping AS number 206 with any given figure, the AS number 206 can be automatically exchanged with the local AS number 110 (e.g., configurable at the discretion of the end-user). Simply exchanging the AS number 206 with an arbitrary figure or one that can be configured may result in unpredictable and/or significantly detrimental results across many different networks. By replacing the AS number 206 with the local AS number 110 (which can be a valid, registered AS number); and making the replacement automatically (which can mitigate errors such as a mistake in configuring the replacement value), the aforementioned unpredictability and/or detrimental results can be substantially avoided.

Figure 6:
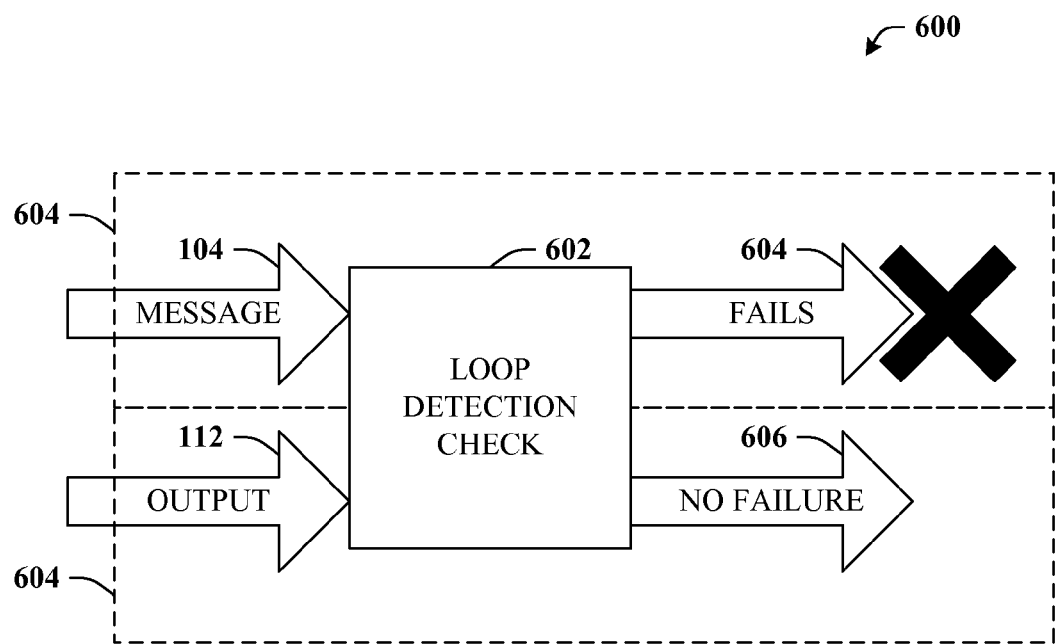
FIG. 6 illustrates a block diagram of an example system that can facilitate a determination of a shortest route for an AS path.

With reference now to FIG. 6, a system 600 that can facilitate a determination of a shortest route for an AS path is illustrated. In compliance with BGP, networks (and/or components therein) such as VPNs must establish their peers/neighbors as well as discern and maintain routing tables that can indicate the shortest route between the current network (or component therein) and any given destination. Hence, networks that employ BGP commonly broadcast update advertisements (e.g., message 104) in order to establish and/or update the shortest route. One way to ensure the shortest route—and a requirement for networks that employ BGP in general—is to perform a loop detection check 602. Since BGP is commonly employed for interconnectivity between autonomous systems (e.g. networks, each of which can independently handle distribution to individual IP addresses within the network), a straightforward check of the AS path included in the message 104 can establish loops.

For example, consider an autonomous system 604, with an AS number of 13900, that receives the message 104 from a peer (not shown). If the loop detection check 602 determines that AS number 13900 exists in the AS path of the message 104, then the current route described by the AS path is (ostensibly) not the shortest route. That is, the message 104 has already traversed the present autonomous system so, according to BGP, if the message 104 is once more entering AS 602 again, the AS path was not the shortest path. Accordingly, the message 104 fails as indicated by element 606 and will not be forwarded. In most cases, the message 104 will simply be dropped or ignored.

However, if the problematic AS number is removed from message 104 (e.g., by the substitution component 108 as detailed in FIGS. 1 and 5) and replaced with a local AS number as is the case with output 112, then there is no failure 608 and the output 112 (e.g. message 104 modified as described herein). While loop detection is sound policy in many cases, there exist situations in which all update messages (e.g., message 104) between two disparate autonomous systems will fail 606. In particular, valid data communications necessary to establish connectivity can be universally discarded, which can lead to reachability issues as described in more detail with reference to FIG. 7.

Figure 7:
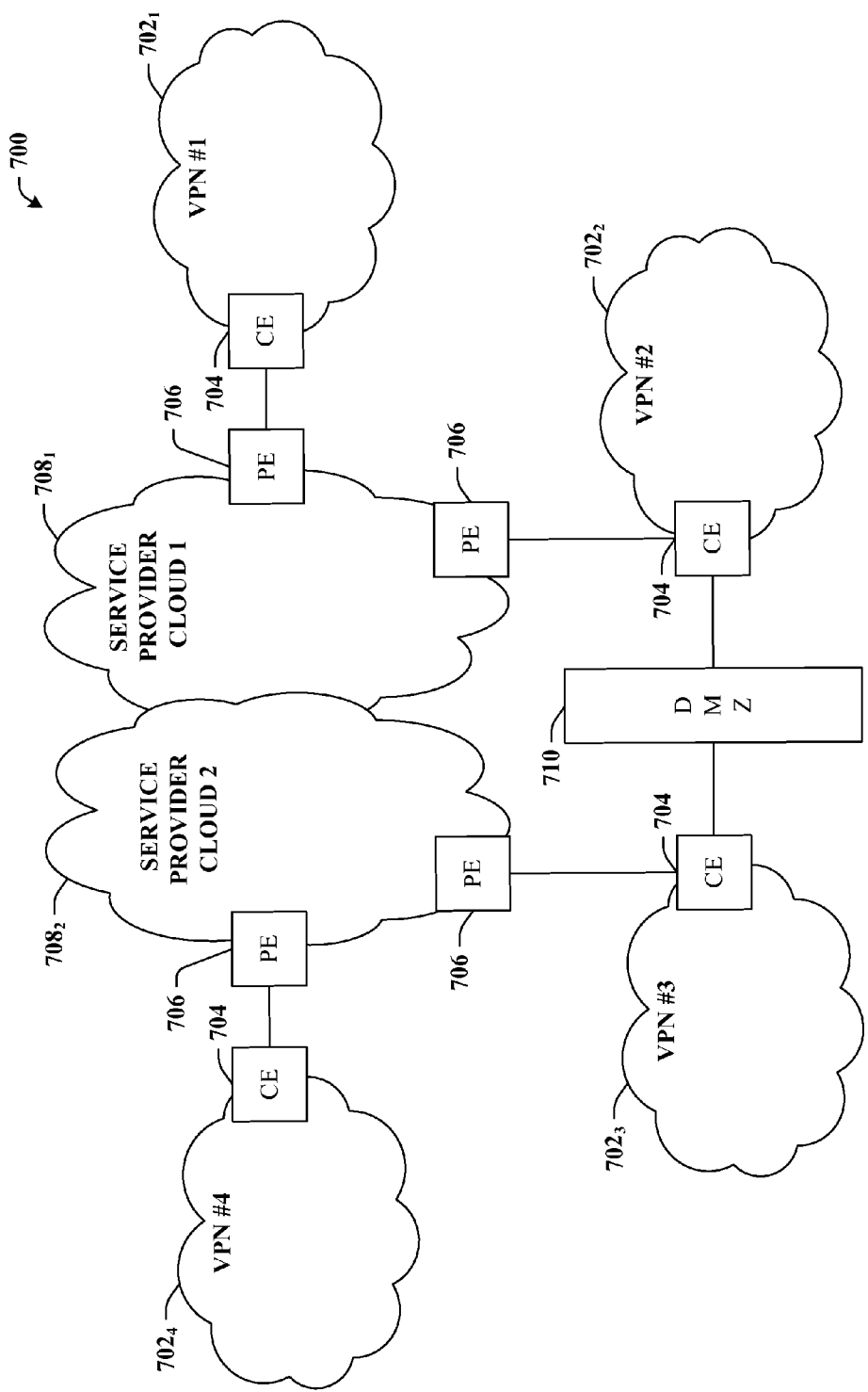
FIG. 7 illustrates a block diagram of an example wide area network (WAN) in which reachability issues can arise.

Turning now to FIG. 7, an example wide area network (WAN) 700 is shown in which reachability issues can arise. The WAN 700 can include a plurality of disparate VPNs such as VPN $702_1$-$702_4$, which can be referred to herein either individually or collectively as VPN 702. However, it should be appreciated that each of the VPNs 702 can have characteristics that are distinguishing from other VPNs 702. In accordance with one embodiment, the VPNs can be a layer 3 VPN (L3VPN) such as a BGP/MPLS (MulitProtocol Label Switching) VPN defined by RFC 2547 or 4364. Each of the VPNs 702 may have a Customer Edge (CE) 704 that can allow access to services. Typically, all traffic entrance and egress occurs by way of the CE 704.

The CE 704 can interface with a Provider Edge (PE) 706 in order to access services. The PE 706 can be configured to interface the CE 704 and provide the services. Generally, PEs 706 exist at the edge of a Service Provider network (e.g., Service Provider Clouds $708_1$, $708_2$) and can provide inter alia an IP backbone for customers. The IP backbone can be ubiquitous, connecting all customer sites (e.g., VPNs 702) by way of various service clouds 708.

For the sake of illustration and not limitation and in accordance with one embodiment, each of the VPNs 702 is managed and/or owned by a single organization/corporation/customer; however, this need not be the case for all embodiments. For example, large organizations/corporations often have discrete and disparate networks at numerous locations across the globe. Each such location can be represented by a different VPN 702. It is to be appreciated that although only four VPNs 702 are shown, virtually any number could exist without departing from the scope and spirit of the claimed subject matter.

While the Service Provider IP backbone can be ubiquitous, oftentimes, it is not an end-to-end solution for packet traffic between the customer VPNs 702. That is, while the various service clouds 708 are interconnected, in some cases a message from VPN $702_1$ to VPN$702_4$ will not be propagated directly from service provider cloud $708_1$ to service provider cloud $708_2$. Rather, in some cases the message must first traverse a firewall or DMZ (De-Militarization Zone) 710. Customers typically require a DMZ 710 when the VPNs 702 individually have varying levels of security. In some cases, especially with large customers, all traffic to and from one of the VPNs 702 must traverse a central DMZ 710.

As with the loop detection checks described supra, securing traffic for customer VPNs 702 is also often very sound policy. However, these two policies can create reachability/connectivity issues. For example, a Service Provider often employs the same AS number for all of the service clouds 708. Thus, when a message leaves a service cloud (e.g., $708_1$), traverses the firewall 710 (as required for customer security), then attempts to re-enter the same or another service cloud (e.g., $708_2$) for forwarding to a destination, the PE 706 will drop the message because the AS number of the service provider already exists in the AS path. In essence, VPN $702_1$ cannot ever in these circumstances establish connectivity and/or reachability information vis-à-vis VPN $702_4$.

In order to mitigate these and other issues, the system 100 of FIG. 1 (as well as the apparatus 800 of FIG. 8 infra) can be employed. For example, by way of illustration and not limitation, system 100 (as well as apparatus 800) can be employed at any or all of the PEs 706 or CEs 704. In accordance therewith, an AS number appended to an AS path prior to traversing a DMZ 710 can be overwritten with an AS number of a local CE 704 or PE 706. Thus, subsequent loop detection at, e.g. a PE 706 need not produce a failure.

Figure 8:
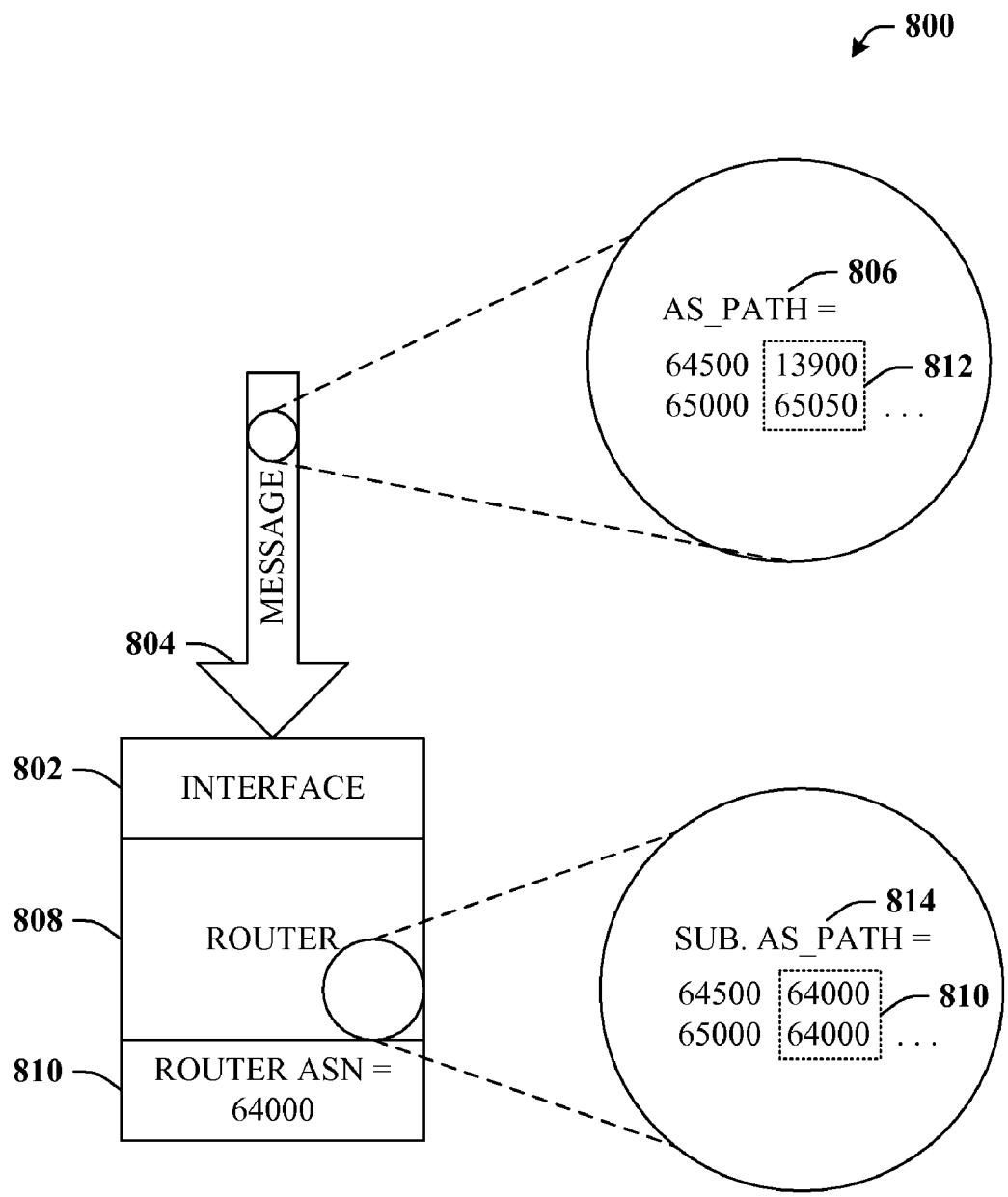
FIG. 8 illustrates an example apparatus that can mitigate loop detection failure by selective modification to AS elements/attributes.

With reference now to FIG. 8, an apparatus 800 that can mitigate loop detection failure by selective modification to AS elements/attributes is depicted. In general, the apparatus 800 can include an interface 802 configured to receive a message 804. The message 804 can include an AS path 806 that shows an ordered route of AS numbers corresponding to the autonomous systems the message 804 traversed prior to receipt by the interface 802. The apparatus 800 can also include a router 808 associated with a router AS number 810. An example of a router AS number 810 as shown here is 64000. The router 808 can be configured as a node for a first VPN such as, e.g. as a node in one of the edges (704, 706) of FIG. 7. That router 808 may substitute at least one AS number (e.g., AS numbers 812) in the AS path 806 with the router AS number 8 10. An example substitution is illustrated in a substitute AS path 814.

In accordance with one embodiment the message 804 can originate from a second VPN and can traverse a firewall or DMZ (e.g., DMZ 710 of FIG. 7) along the route defined by the AS path 806. According to one embodiment, both the first and the second VPN can be managed by a single customer or organization. In one embodiment, the first and second VPN are provided an IP backbone as well as other services by a single service provider. Generally, the services provided by the service provider correspond to a single AS number as relating to message 804. It is to be appreciated that, in accordance with one embodiment of the claimed subject matter, the router 808 can operate according to a BGP routing policy defined by RFC 1771. It is to be further appreciated that system 100 of FIG. 1 can be a component of router 808 in certain embodiments.

Figure 9:
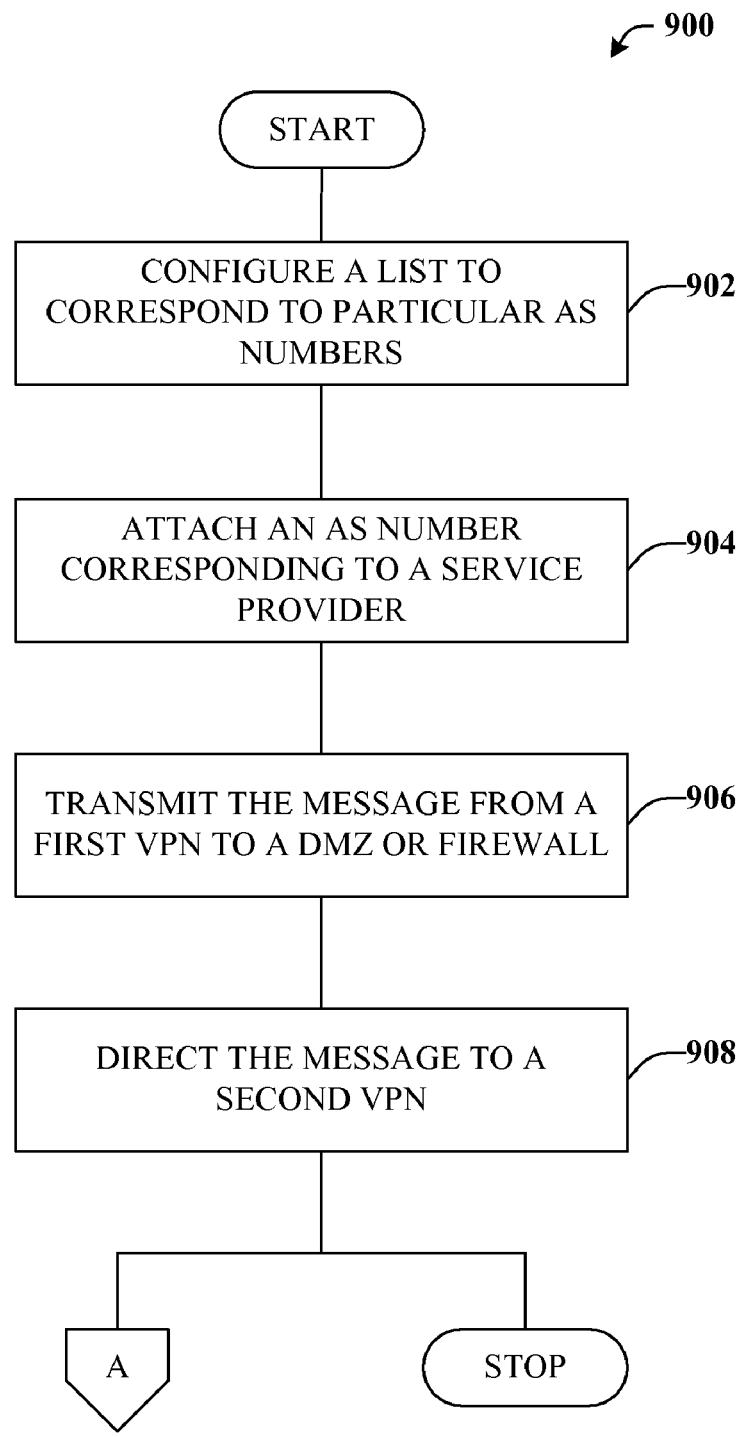
FIG. 9 illustrates an example method for establishing problematic AS numbers and directing a message through a DMZ or firewall.
Figure 10:
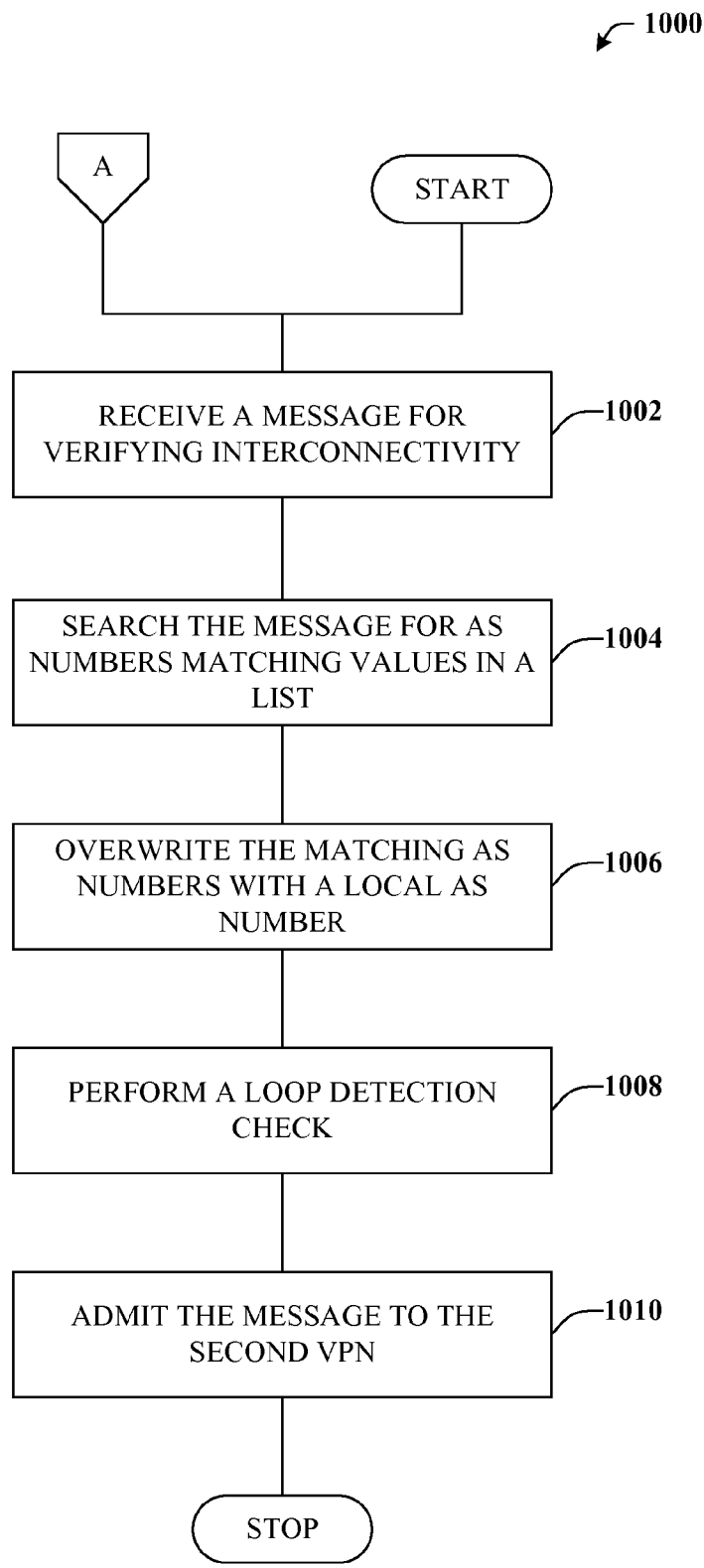
FIG. 10 illustrates an example method for mitigating loop detection failure by selective modifying AS elements/attributes.

FIGS. 9 and 10 illustrate process flow diagrams of computer-implemented methods. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the claimed subject matter, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 9, a method 900 for establishing problematic AS numbers and directing a message through a DMZ or firewall is illustrated. Typically, at reference numeral 902, a list corresponding to particular AS numbers can be configured. For example, the list can be implemented with AS numbers that are known to create reachability issues such as AS numbers corresponding to service provider networks. In addition, the list can be configured with AS numbers inferred from various data sets by employing algorithms/mechanisms, as described in connection the intelligence component 402 of FIG. 4.

At reference numeral 904, a problematic AS number can be attached to the message. As indicated, often, this problematic AS number corresponds to the service provider that manages connectivity for customer VPNs (e.g., the VPN from which the message originated as well as, potentially, a disparate VPN that is the destination of the message). At reference numeral 906, the message can be forwarded to a firewall and/or DMZ. For instance, the act indicated by reference numeral 904 can in certain cases relate to receiving the message from the VPN of origin, after which the message can be forwarded to a firewall en route to the destination. Accordingly, at reference numeral 908, the message can be directed toward a second VPN (e.g., the destination), generally, by way of the common service provider backbone, since a customer typically employs the same service provider to service all customer VPNs.

With reference to FIG. 10, a method 1000 for mitigating loop detection failure by selective modifying AS elements/attributes is illustrated. At reference numeral 1002, a message (e.g., in one embodiment, the message discussed at reference numerals 904-908 of FIG. 9) can be received. The message can be a message for verifying connectivity and/or reachability such as, e.g. an open/update route message in accordance with BGP distribution. At reference numeral 1004, the message can be searched for particular AS numbers such as known and/or inferred problematic AS numbers. These problematic AS numbers can be detected by searching the message (and/or the AS path of the message) for AS numbers that match configurable values in a list.

At reference numeral 1006, the matching AS numbers (e.g., those that are known and/or inferred to be problematic) can be overwritten with a local AS number. Accordingly, if a loop detection check is performed on the message, such as at reference numeral 1008, then the message can pass the loop detection test. It is to be appreciated that in many circumstances if the problematic AS numbers appear in the AS path of the message, a loop detection check would drop the message, thereby preventing connectivity between the origin of the message and its destination.

However, by overwriting the problematic AS numbers as discussed at reference numeral 1006, the loop detection at reference numeral 1004 can be successfully navigated and the message can gain access to an autonomous system into which it might otherwise be barred, and, e.g. forwarded to the destination network/VPN. At reference numeral 1010, the message can be admitted to the destination network and/or VPN. As such, the message can be employed to successfully establish connectivity between the aforementioned networks and/or be employed to update reachability information such as routing tables and the like.

Figure 11:
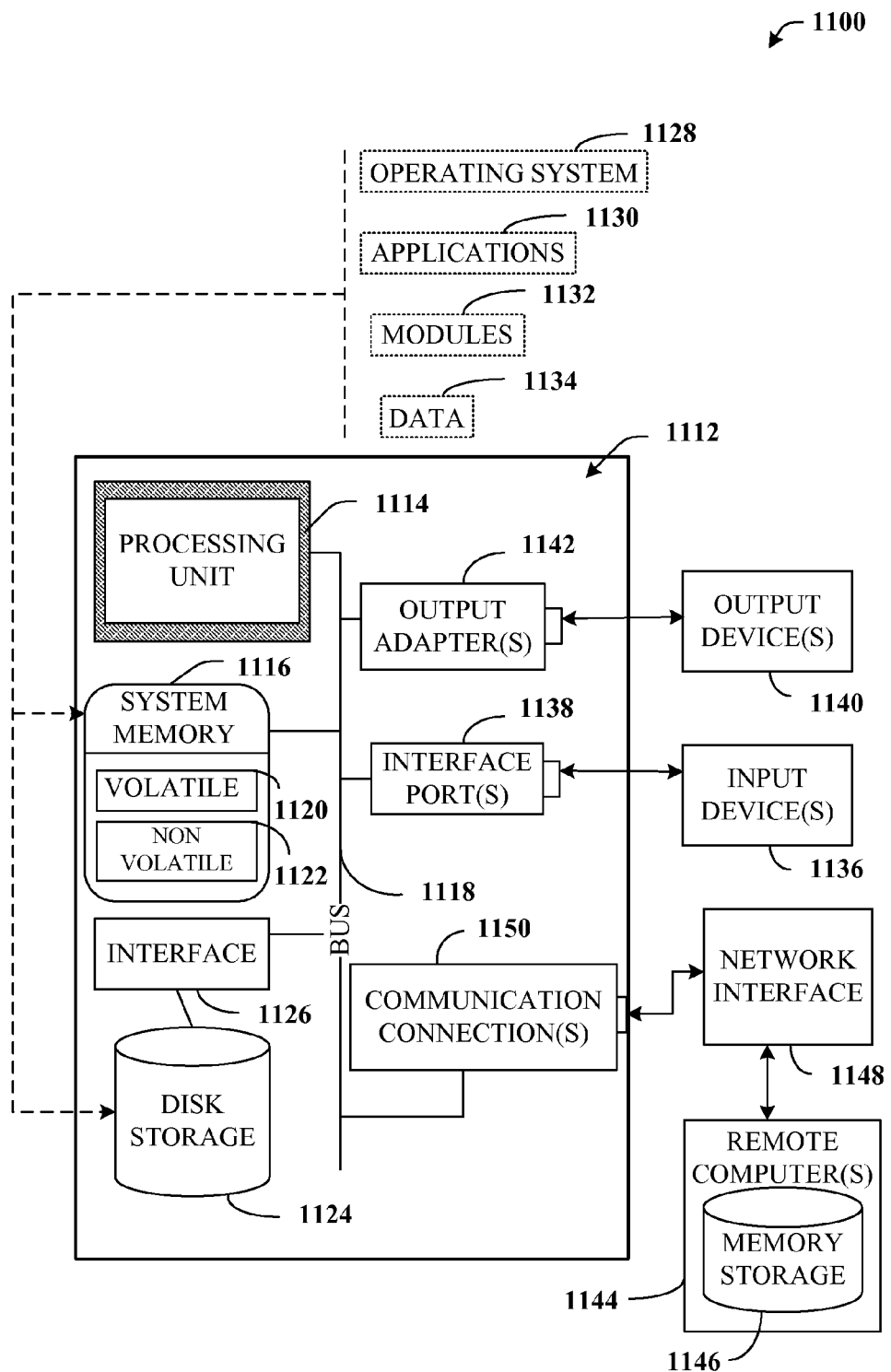
FIG. 11 illustrates an example operating environment that can be employed in accordance with one or more embodiments of the claimed subject matter.
Figure 12:
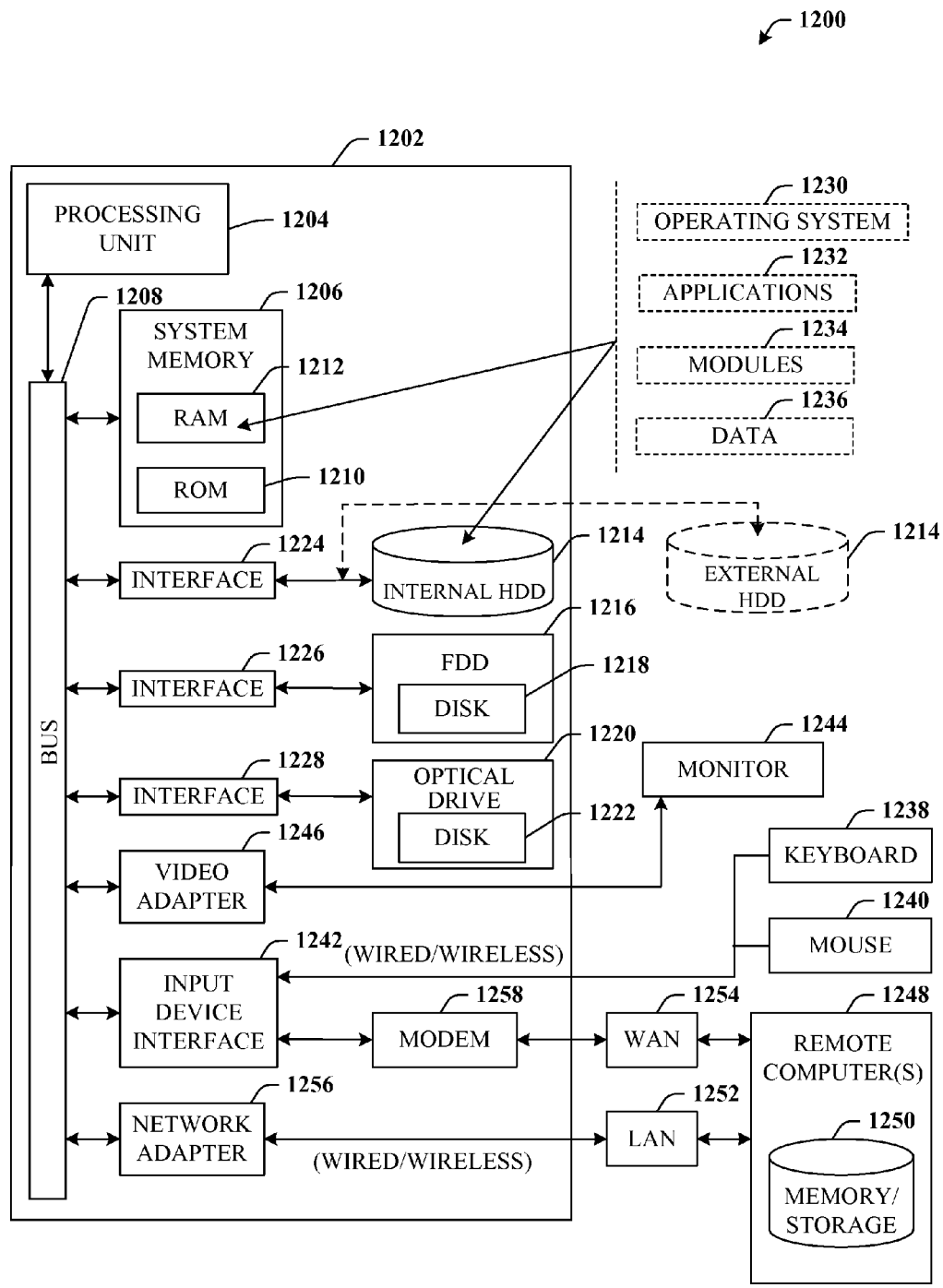
FIG. 12 illustrates an example operating environment that can be employed in accordance with one or more embodiments of the claimed subject matter.
Figure 13:
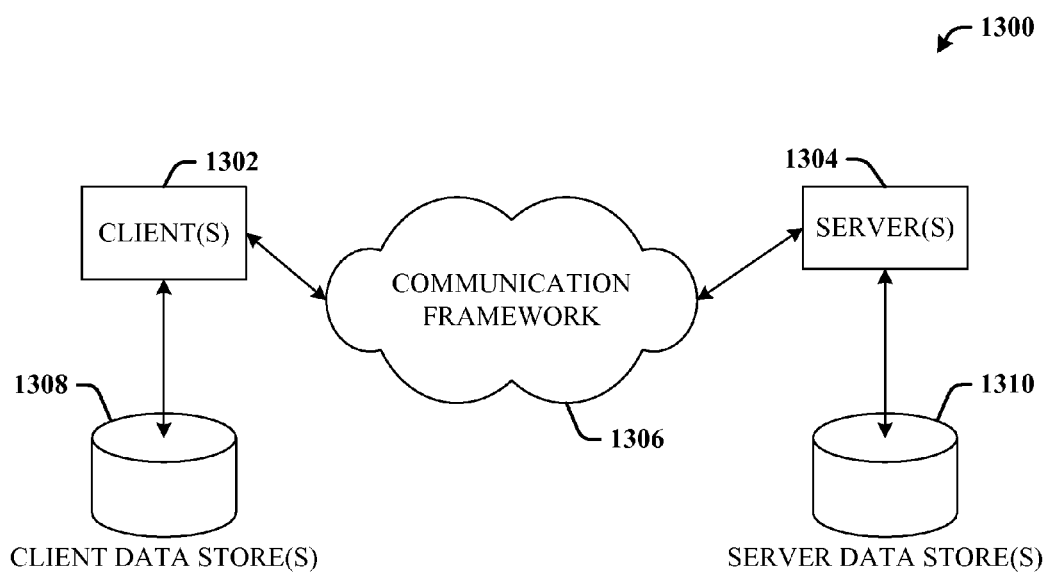
FIG. 13 illustrates an example networking environment, wherein one or more of the embodiments of the claimed subject matter can be employed.

In order to provide additional context for implementing various embodiments of the claimed subject matter, FIGS. 11-13 and the following discussion is intended to provide a brief, general description of some suitable computing environments in which the various embodiments of the claimed subject matter may be implemented. For example, a substitution mechanism that mitigates loop detection, as described in the previous figures, can be implemented in, e.g., a router, or in another manner within one of the suitable (or similar) computing environment detailed infra. Moreover, the router as described in the figures herein may itself be implemented in one of the following suitable (or similar) computing environments. While portions of the claimed subject matter has been described above in the general context of computer-executable instructions of a computer program that runs on a local computer and/or remote computer, those skilled in the art will recognize that the subject matter may also be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated embodiments of the claimed subject matter may also be practiced in distributed computing environments where certain tasks are performed by remote processing devices that are linked through a communications network. However, some, if not all, embodiments of the claimed subject matter may be practiced on stand-alone computers. In a distributed computing environment, program modules may be located in local and/or remote memory storage devices.

With reference to FIG. 11, an example environment 1100 for implementing various embodiments of the claimed subject matter includes a computer 1111. The computer 1111 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE1394), and Small Computer Systems Interface (SCSI).

The system memory 1116 includes volatile memory 1120 and nonvolatile memory 1122. The basic input/output system (BIOS), containing the basic routines to transfer information between elements within the computer 1111, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1111 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 can describe software that acts as an intermediary between users and the basic computer resources described in the suitable operating environment 1100. Such software includes an operating system 1128. Operating system 1128, which can be stored on disk storage 1124, acts to control and allocate resources of the computer system 1111. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user can enter commands or information into the computer 1111 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1111 and to output information from computer 1111 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1111 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1111. For purposes of brevity, only a memory storage device 1146 is illustrated with remote computer(s) 1144. Remote computer(s) 1144 is logically connected to computer 1111 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1111, it can also be external to computer 1111. The hardware/software necessary for connection to the network interface 1148 includes, for example purposes only, internal and external technologies such as, modems including regular telephone grade modems, cable modems and DSL modems, ISDN adapters, and Ethernet cards.

Referring now to FIG. 12, there is illustrated a block diagram of an exemplary computer system operable to execute the disclosed architecture. In order to provide additional context for various aspects of the claimed subject matter, FIG. 12 and the following discussion are intended to provide a brief, general description of a suitable computing environment 1200 in which the various aspects of the claimed subject matter can be implemented. For example, various components of the systems and/or aspects thereof described supra can be implemented by way of the system 1200. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the claimed subject matter includes a computer 1202, the computer 1202 including a processing unit 1204, a system memory 1206 and a system bus 1208. The system bus 1208 couples to system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE1394 interface technologies. Other external drive connection technologies are within contemplation of the claimed subject matter.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the claimed subject matter can be implemented with various commercially available operating systems or combinations of operating systems.

A user can enter commands and information into the computer 1202 through one or more wired/wireless input devices, e.g. a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1294 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g. a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 12BaseT wired Ethernet networks used in many offices.

FIG. 13 is a schematic block diagram of a sample-computing environment 1300 with which the claimed subject matter can interact. The system 1300 includes one or more client(s) 13 10. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1340 that can be employed to store information local to the client(s) 1310. Similarly, the server(s) 1320 are operably connected to one or more server data store(s) 1330 that can be employed to store information local to the servers 1320.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example embodiments of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
an intelligence component configured to automatically construct and update a list of two or more screening values, each of the two or more screening values corresponding to a flagged autonomous system (AS) number that is determined as causing a failure in a loop detection check, the intelligence component being further configured to automatically detect a decrease in probability of at least one of the two or more screening values causing the failure in the loop detection check and configured to remove at least one of the two or more screening values from the list based on automatic detection of the decreased probability, the decreased probability being characterized by less than a change from full failure to full success and based on employment of at least one of AS-in, AS-override, or redistribution of Border Gateway Protocol (BGP) to Interior Gateway Protocol (IGP) or a combination thereof;
a screening component configured to receive a message including an AS path that comprises at least one AS number, the screening component being further configured to compare the AS path with the list of the two or more screening values to detect from the AS path an AS number that matches the flagged AS number; and
a substitution component configured to modify the AS path by automatically replacing the AS number with a local AS number in response to detecting a match between the AS number and the flagged AS number, the local AS number not causing a failure in the loop detection check of the AS path.

2. The system of claim 1, wherein the message is at least one of an open route message or an update route message.

3. The system of claim 1, wherein the each of the two or more screening values is configurable.

4. The system of claim 1, wherein at least one of the two or more screening values is configured to correspond to a service provider AS number.

5. The system of claim 4, wherein the AS number is appended to the message at a provider edge.

6. The system of claim 1, wherein the local AS number is not configurable.

7. The system of claim 1, wherein the local AS number is registered with Internet Assigned Numbers Authority (LANA) or Internet Corporation for Assigned Numbers and Names (ICANN).

8. The system of claim 1, wherein the intelligence component is further configured to provide reasoning for determining the flagged AS number as causing the failure in the loop detection check.

9. The system of claim 8, wherein the providing the reasoning for determining the flagged AS number as causing the failure in the loop detection check comprises computing a probability distribution over states of interest based on a consideration of associated AS numbers.

10. An apparatus, comprising:
an interface configured to receive a message, the message comprising an autonomous system (AS) path;
a router configured to be a node for a first Virtual Private Network (VPN) and associated with a router AS number, the router being further configured to access an automatically constructed list of two or more screening values, each of the two or more screening values corresponding to a flagged AS number that is determined as causing a failure in a loop detection check, the router being further configured to compare the AS path with the automatically constructed list of the two or more screening values to detect from the AS path at least one AS number that matches the flagged AS number, and further configured to modify the AS path by automatically replacing the at least one AS number in the AS path with the router AS number in response to detecting a match between the at least one AS number and the flagged AS number, the router AS number not causing a failure in the loop detection check of the AS path; and
an intelligence component configured to automatically detect a decrease in probability of at least one of the two or more screening values causing the failure in the loop detection check and configured to remove at least one of the two or more screening values from the list based on automatic detection of the decreased probability, the decreased probability being characterized by less than a change from full failure to full success and based on employment of at least one of AS-in, AS-override, or redistribution of Border Gateway Protocol (BGP) to Interior Gateway Protocol (IGP) or a combination thereof.

11. The apparatus of claim 10, wherein the message originates from a second VPN.

12. The apparatus of claim 11, wherein the first VPN and the second VPN are both managed by a single organization.

13. The apparatus of claim 11, wherein the first VPN and the second VPN are provided an Internet Protocol (IP) backbone by a single service provider.

14. The apparatus of claim 11, wherein the first VPN and the second VPN conform to RFC 2547 or RFC 4364.

15. The apparatus of claim 10, wherein the message traverses a firewall or a De-Militarization Zone (DMZ) along a route defined by the AS path.

16. The apparatus of claim 10, wherein the router provides a routing policy in accordance with Border Gateway Protocol (BGP) defined by RFC 1771.

17. A method, comprising:
automatically constructing and updating a list of two or more screening values, each of the two or more screening values corresponding to a flagged autonomous system (AS) number that is determined as causing a failure in a loop detection check, the automatically constructing and updating of the list including automatically detecting a decrease in probability of at least one of the two or more screening values causing the failure in the loop detection check and removing at least one of the two or more screening values from the list based on automatic detection of the decreased probability, the decreased probability being characterized by less than a change from full failure to full success and based on employment of at least one of AS-in, AS-override, or redistribution of Border Gateway Protocol (BGP) to Interior Gateway Protocol (IGP) or a combination thereof;
receiving a message including an AS path that comprises at least one AS number for verifying interconnectivity;
comparing the AS path with the list of the two or more screening values to detect from the AS path AS numbers that match a corresponding flagged AS number; and
modifying the AS path by automatically overwriting the AS numbers with a local AS number in response to detecting a match between the AS numbers and the corresponding flagged AS number, the local AS number not causing a failure in the loop detection check of the AS path.

18. The method of claim 17, further comprising at least one of the following acts:
attaching to the message an AS number corresponding to a service provider that manages connectivity for a first VPN;
forwarding the message from the first VPN to a DMZ or firewall;
directing the message to a second VPN, the service provider managing connectivity for the second VPN;
performing a loop detection check subsequent to the act of overwriting; or
admitting the message to the second VPN.

* * * * *

UNITED STATES PATENT AND TRADEMARK OFFICE
CERTIFICATE OF CORRECTION

| | | |
|---|---|---|
| PATENT NO. | : 8,065,438 B2 | Page 1 of 1 |
| APPLICATION NO. | : 11/559581 | |
| DATED | : November 22, 2011 | |
| INVENTOR(S) | : Pranav Mehta et al. | |

It is certified that error appears in the above-identified patent and that said Letters Patent is hereby corrected as shown below:

On the title page, in item (75), in "Inventors", in column 1, line 3, delete "Rszuk," and insert -- Raszuk, --, therefor.

In column 16, line 62, in Claim 7, delete "(LANA)" and insert -- (IANA) --, therefor.

Signed and Sealed this
Twenty-eighth Day of February, 2012

David J. Kappos
*Director of the United States Patent and Trademark Office*